US007533917B2

(12) United States Patent
Tong et al.

(10) Patent No.: US 7,533,917 B2
(45) Date of Patent: May 19, 2009

(54) INTEGRATED KITCHEN UNIT FOR A MOBILE VEHICLE

(75) Inventors: Calvin Tong, East Brunswick, NJ (US);
Ryan Berens, Ramsey, NJ (US);
Andrew Kilb, Carrboro, NC (US);
David M. Wynne, Fishkill, NY (US);
Alexander Loa, Pilesgrove, NJ (US);
Michael Powers, Princeton, NJ (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 494 days.

(21) Appl. No.: 11/396,877

(22) Filed: Apr. 3, 2006

(65) Prior Publication Data

US 2006/0226669 A1    Oct. 12, 2006

Related U.S. Application Data

(60) Provisional application No. 60/669,635, filed on Apr. 7, 2005.

(51) Int. Cl.
*B60P 3/20* (2006.01)
*F24B 1/26* (2006.01)
(52) U.S. Cl. .................. 296/24.3; 296/22; 296/24.35
(58) Field of Classification Search ............. 296/22, 296/24.3, 24.32, 34.35, 34.36, 37.6, 37.8, 296/24.35, 24.36, 37.1; 62/239; 99/324, 99/352, 357, 484; 126/1 R; 220/3.9, 476, 220/495.03, 592.01, 592.02, 592.03
See application file for complete search history.

(56) References Cited

U.S. PATENT DOCUMENTS 3,937,977 A    2/1976  Carr
3,949,902 A  * 4/1976  Thompson ............... 222/129.1
4,065,115 A    12/1977 Popeil et al.
4,145,941 A    3/1979  Davis
4,254,881 A    3/1981  Hard
4,281,460 A    8/1981  Harris
4,390,551 A    6/1983  Swartley et al.
4,407,414 A    10/1983 Rey et al.
4,570,339 A    2/1986  Taylor
4,620,476 A    11/1986 Brym
4,632,836 A  * 12/1986 Abbott et al. ............. 426/302

(Continued)

*Primary Examiner*—Glenn Dayoan
*Assistant Examiner*—Gregory Blankenship
(74) *Attorney, Agent, or Firm*—Mark C. Bach; Jeffrey P. Calfa

(57) ABSTRACT

An integrated kitchen unit for a mobile vehicle. The integrated kitchen unit intended to make preparation, eating, and cleaning easier and more intuitive than the existing solution. The integrated kitchen unit provides multiple storage areas based on the needs required for cooking, including storage for utensils, and even storage for a range of third party appliances. The microwave becomes an integrated part of the design, opening up additional space and allowing for optimized ergonomics of preparation surfaces. Extendable tables can be pulled out for additional surfaces or for other needs such as desk area. Standard 110V AC outlets included in the design allow drivers to plug in any third party appliance, possible providing inverters be installed in the berth. A disposal container is located on the side of the integrated kitchen unit, allowing for easy access while preparing at the workstation, and even while driving. A feature which may provide for easier cleanup is a bendable and washable surface that attaches to the preparation surface, allowing for immediate cleanup by folding up the surface and cleaning it at a later time when the driver stops at a truck stop.

16 Claims, 2 Drawing Sheets

U.S. PATENT DOCUMENTS

| | | | |
|---|---|---|---|
| 4,689,840 A | 9/1987 | Mück et al. | |
| 4,893,885 A | 1/1990 | Borello | |
| 4,919,477 A * | 4/1990 | Bingham et al. | 296/24.36 |
| 4,961,607 A * | 10/1990 | Marshall, Sr. | 296/156 |
| 5,183,165 A | 2/1993 | Acona et al. | |
| 5,285,604 A | 2/1994 | Carlin | |
| 5,438,842 A | 8/1995 | Watkins et al. | |
| 5,501,441 A | 3/1996 | Kegley | |
| 5,507,414 A | 4/1996 | Ong | |
| 5,526,621 A | 6/1996 | Shelton | |
| 5,546,852 A | 8/1996 | Bidwell | |
| 5,555,640 A | 9/1996 | Ou | |
| 5,678,733 A | 10/1997 | Ong | |
| 5,680,676 A | 10/1997 | Spirk et al. | |
| 5,730,120 A | 3/1998 | Yonkers, Jr. | |
| 5,738,242 A | 4/1998 | Paris | |
| 5,775,319 A | 7/1998 | Pettinari | |
| 5,782,105 A | 7/1998 | Stork | |
| 5,787,719 A * | 8/1998 | Wilson | 62/236 |
| 5,797,791 A | 8/1998 | Humphrey et al. | |
| 5,913,270 A | 6/1999 | Price | |
| 5,915,851 A * | 6/1999 | Wattrick et al. | 4/619 |
| 5,924,592 A | 7/1999 | Hieronymus | |
| 5,938,141 A | 8/1999 | Kanbar | |
| 5,947,808 A | 9/1999 | Adams | |
| 5,957,557 A | 9/1999 | Langer et al. | |
| 5,960,503 A | 10/1999 | Del Pozo Y Mattei | |
| 6,079,400 A | 6/2000 | Tomat Dany | |
| 6,129,433 A | 10/2000 | Rosenberg et al. | |
| 6,164,478 A * | 12/2000 | Cant | 220/62.1 |
| 6,190,711 B1 | 2/2001 | Lenz | |
| 6,248,981 B1 | 6/2001 | Check | |
| 6,254,160 B1 * | 7/2001 | Marriott et al. | 296/24.3 |
| 6,274,232 B1 | 8/2001 | Otten et al. | |
| 6,298,488 B1 | 10/2001 | Duncan et al. | |
| 6,361,428 B1 | 3/2002 | Tosconi et al. | |
| 6,370,713 B2 | 4/2002 | Bosio | |
| 6,371,470 B1 | 4/2002 | Ward | |
| 6,431,628 B1 * | 8/2002 | Bell, Jr. | 296/24.32 |
| 6,547,080 B1 | 4/2003 | Guard | |
| 6,595,120 B1 | 7/2003 | Tiemann | |
| 6,659,293 B1 | 12/2003 | Smith | |
| 6,702,411 B2 | 3/2004 | Helver | |
| 6,732,403 B2 | 5/2004 | Moore et al. | |
| 6,732,883 B2 | 5/2004 | Petzitillo, Jr. et al. | |
| 6,732,962 B1 | 5/2004 | Butler | |
| 6,745,702 B2 | 6/2004 | Goldberg et al. | |
| 6,789,792 B1 | 9/2004 | Angland | |
| 6,796,452 B2 | 9/2004 | Petzitillo, Jr. et al. | |
| 6,804,930 B2 | 10/2004 | Stravitz | |
| 6,805,204 B2 | 10/2004 | Bauer et al. | |
| 6,810,819 B2 | 11/2004 | Kaniuk et al. | |
| 6,814,383 B2 * | 11/2004 | Reed et al. | 296/24.3 |
| 6,837,394 B2 | 1/2005 | Nnamani | |
| 6,840,182 B2 | 1/2005 | Price | |
| 6,851,357 B1 | 2/2005 | Martorella et al. | |
| 6,852,953 B1 | 2/2005 | Lee | |
| 7,210,722 B2 * | 5/2007 | Bernstein et al. | 296/24.3 |

* cited by examiner

INTEGRATED KITCHEN UNIT FOR A MOBILE VEHICLE

This patent issues from a non-provisional patent application claiming the priority of provisional patent application Ser. No. 60/669,635, filed Apr. 7, 2005.

BACKGROUND

Trucks carry a bulk of the goods within the United States. Driver's have a difficult lifestyle in which they spend much of their time within the cab and sleeper of their over the road tractor trailers. The truck becomes their home away from home. The sizing constraints of the sleeper berth are a well-known hurdle to truck manufactures. One major challenge is to enhance the meal experience in the truck so that it feels more like home.

The consumer market is dynamic and evolving and that the landscape of the entire country is far from stagnant. Factors including new awareness in Homeland Security and concerns, both personal and communal, about health and the environment are changing the expectations and buying habits of consumers around the country. Some of the new concerns about safety have even begun to change the face of the trucking industry, changing some rules and regulations which were set decades ago. Drivers must adhere to different hours on the road and face new and more restrictive rules about engine idling even when the temperatures drop below freezing. Some of the global and industry level factors which the inventors consider key in the pursuit of our opportunity to improve the meal experience include the following:

- Increasing attention to road safety including hours of service regulation
- Increasing concern over personal health and diet
- Increasing concern about the environment
- National average driver turnover rate of 116%
- High costs to hire and train drivers
- Record high fuel costs
- Increased electrification of truck stops
- Increasing availability of alternative electricity sources to drivers To achieve an improved meal experience within the sleeper berth of a long-haul vehicle, the inventors considered both the business related aspects of the fleet owners as well as the lifestyle and experience oriented expectations and dreams of the actual drivers. These factors revealed that the two different stakeholders share common issues with tangible solutions that sometimes can come into conflict. For example, a fleet owner wishes to reduce idling and save more money in operations. Installing an alternative power unit (APU) for a driver would help satisfy that goal but requires a significant upfront investment that conflicts with the original cost saving goal. This integrated kitchen unit circumvents these issues by improving the current experience within the sleeper at a minimal cost. The objective was to take all these trends into consideration and complete the product design in a manner that recognizes certain conflicts among key stakeholders and improves both the bottom line for the fleet owners, as well as the long-haul driving experience that truck drivers have can come to expect from a truck original equipment manufacturer.

SUMMARY

This invention relates to an integrated kitchen unit for a mobile vehicle. The integrated kitchen unit is intended to make preparation, eating, and cleaning easier and more intuitive than the existing solution. The integrated kitchen unit provides multiple storage areas based on the needs required for cooking, including storage for utensils, and even storage for a range of third party appliances. The microwave becomes an integrated part of the design, opening up additional space and allowing for optimized ergonomics of preparation surfaces. Extendable tables or cutting boards can be pulled out for additional surfaces or for other needs such as desk area. Standard 110V AC outlets included in the design allow drivers to plug in any third party appliance, possible providing inverters be installed in the berth. A disposal container is located on the side of the integrated kitchen unit, allowing for easy access while preparing at the workstation, and even while driving. A feature which may provide for easier cleanup is a bendable and washable surface that attaches to the preparation surface, allowing for immediate cleanup by folding up the surface and cleaning it at a later time when the driver stops at a truck stop.

DRAWINGS

Other objects and advantages of the invention will become more apparent upon perusal of the detailed description thereof and upon inspection of the drawings, in which.

DESCRIPTION OF INVENTION

Figure 1:
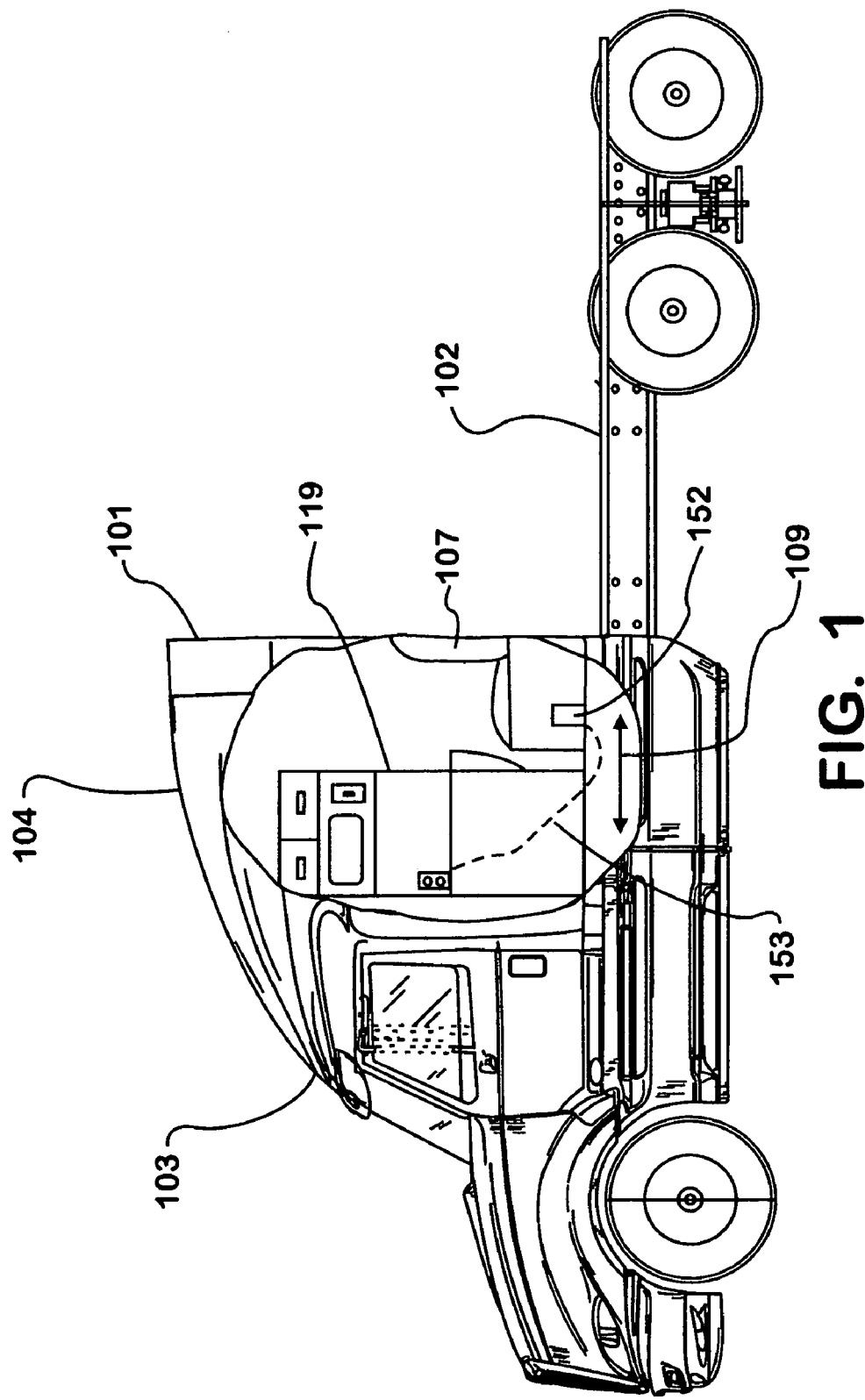
FIG. 1 is a side view of a mobile vehicle with an integrated kitchen unit made in accordance with the invention installed.
Figure 2:
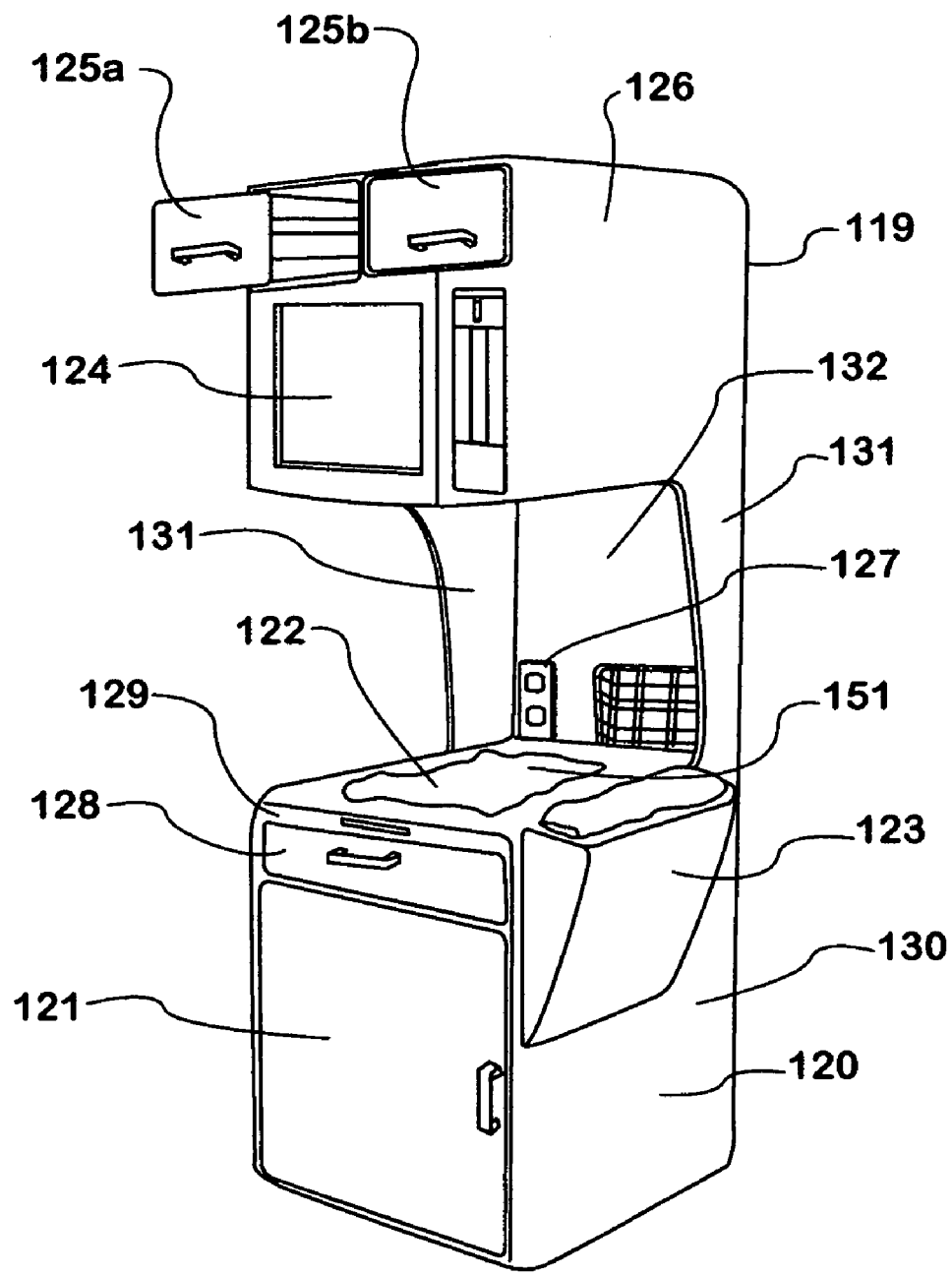
FIG. 2 is a front perspective view of the integrated kitchen unit of the mobile vehicle of FIG. 1.

A motor vehicle 101, specifically a tractor trailer, includes a cab 103 engaged to a drive train bearing chassis 102. For over the road tractors, there will be a sleeper compartment 104 that includes a driver living space. The sleeper compartment 104 includes a mounting floor 105 as well as the off duty living space for the driver or drivers. The vehicle 101 shown in FIG. 1 has an integrated kitchen unit 119 made in accordance with the invention mounted within the sleeper compartment 104 on the mounting floor 105. There may be a couch 107 engaged onto the mounting floor 105 in the vicinity of the integrated kitchen system 119 in the rearward portion of the sleeper compartment 104.

The integrated kitchen unit 119 is comprised of an integrated structural frame 120. The integrated structural frame 120 includes a rectangular lower section 130 that is mounted to the mounting floor 105 of the sleeper compartment 104. The rear of the rectangular lower section 120 projects upwards with integrated side walls 131 and integrated back wall 132. The integrated side walls 131 and integrated back wall 132 engaged to each other at rear edges of the side walls 131 and outer edges of the back wall 132. The integrated side walls 131 and integrated back wall 132 extend upwards into an integrated rectangular upper section 126. The rectangular lower section 130 may contain an integrated refrigerator 121. An upper food preparation surface 122 may constitute the upper surface of the lower section 130. A disposal unit 123 may be integrated into a side wall of the lower section 130, allowing a user to prepare items on the food preparation surface 122 and slide waste directly into the disposal unit 123. The disposal unit 123 may be triangular based opening up at a top section adjacent to the food preparation surface 122. There may be a bendable and washable secondary surface 151 that attaches to the preparation surface 122, allowing for immediate cleanup by folding up the surface and cleaning it at a later time when the driver stops at a truck stop. In one embodiment, the secondary surface 151 may be engaged to the food preparation surface 122 by hook and loop fasteners. An integrated microwave oven 124 may be included within the integrated rectangular upper section 126. Upper storage draws 125a and 125b may be included in an area above the microwave oven 124. The upper storage draws 125a and 125b are slidable out of the integrated upper section 126. There may be a 110V alternating current (AC) plug-in power outlet 127 engaged to provide power out of the integrated back wall 132. The vehicle 101 may include a DC to AC power inverter 152 to convert DC from the vehicle's electrical system 109 for the AC power outlets 127. The inverter 152 is electrically engaged to the AC power outlet 127 through internal wiring 153. The lower rectangular section 130 may include a storage drawer 128 that is slidable out from just under the food preparation surface 122. There also may be a slidable cutting board 129 out from between the storage drawer 128 and the food preparation surface 122.

The integrated kitchen unit 119 is intended to make preparation, eating, and cleaning easier and more intuitive than the existing solution. The integrated kitchen unit provides multiple storage areas 125a, 125b, and 128 based on the needs required for cooking, including storage for utensils, and even storage for a range of third party appliances. The microwave becomes an integrated part of the design, opening up additional space and allowing for optimized ergonomics of preparation surfaces. Extendable tables 129 can be pulled out for additional surfaces or for other needs such as desk area. Standard 110V outlets 127 included in the design allow drivers to plug in any third party appliance, possible providing inverters be installed in the berth. A disposal container 123 is located on the side of the kitchen unit 119, allowing for easy access while preparing at the workstation, and even while driving. A feature which may provide for easier cleanup is a bendable and washable surface 151 that attaches to the preparation surface 122, allowing for immediate cleanup by folding up the surface and cleaning it at a later time when the driver stops at a truck stop.

The integrated kitchen unit 119 is positioned towards budget conscious drivers who want to prepare basic to moderately complex meals, while maintaining the ease of use required in a successful integrated kitchen unit. By prioritizing the functionality of the space towards the meal experience in an integrated unit 119, the drivers will feel a more satisfying experience in their cabin. Currently, no original equipment manufacturer (OEM) has considered this direction successfully, allowing for product differentiation in the current market.

The task analysis proves the need for an inclusive unit especially because of the time and amount of moving around required to prepare and cook a meal. It also emphasizes the need for a quick and easy way to clean, because the current situation requires trash improvisations, and cleaning with water bottles and paper towels, as well as having to exit the cabin frequently to dispose of trash.

This integrate kitchen unit is a system that responds to the requirements of food preparation and cooking, as well as the cleanup that is necessary afterwards. The design moves up the prep surface above the refrigerator 121 to be more ergonomic and more accessible. As a result, the microwave 124 is also moved upwards, and consequently is also at a more accessible height. There is dedicated storage 125a and 125b above the microwave 124, as well as utensil storage 128 under the preparation surface 122. Waste disposal 123 is located to the side of the unit 119, and is very easily reached from the preparation surface. To aid in waste disposal, there is a bendable, removable cover 151 for the prep surface 122 to capture soiling, which can also transport waste or soiled dishes when taken to be cleaned. Power outlets 127, supplied by an inverter, are located adjacent to the preparation surface 122, and can accommodate any third-party device the user wishes to bring into the truck. This unit 119 will provide users with the system they need to more efficiently and easily achieve the meals they commonly consume, such as cold-cut sandwiches and burgers.

The direction for a product design that satisfies the team's goals is an integrated food preparation unit 119 which can accommodate third-party cooking appliances. Such appliances would include hotplates, "hot boxes," electric grills or griddles, and others. The unit would be positioned above the refrigerator, and include a preparation surface, storage cabinets, electrical outlets, and waste disposal container. The desired aesthetic is of a "hooded" kitchen countertop, much like one would associate with a ventilated stove. This would remove the disconnected cabinet configuration currently in place by integrating the unit for the fridge with an upper unit. The inventors believe this is the best solution for resolving the current difficulties with preparing simple meals like sandwiches, as well as for allowing the use of third-party devices, which will greatly improve the options for those desiring to cook their own meals.

The surfaces currently offered for food preparation include either the desk, if not in use, or an improvised surface, such as a napkin or board laid upon a trucker's lap, bed, or other surface. The design direction proposes to offer a dedicated surface above the fridge, which could be extended, as well as to allow easier access to this area for a user positioned in front of the unit. The surface is also intended to be easily cleaned after use.

Many truckers consulted for this project identified several appliances they already own and would like to use in the truck, however power and space constraints prohibit them from being able to use such devices. The team's design would provide outlets for these appliances, a dedicated preparation surface as described above, and storage for the items and utensils when it is not in use. Naturally, these accommodations do not demand the use of such appliances by those uninterested in cooking for themselves, and could be utilized for other purposes more befitting of the specific driver's desires.

A large concern and frustration of those cooking is the necessary cleanup afterwards. Part of the design's solution for this includes a dedicated area for waste disposal, which is easily accessed while using the unit. Also, under consideration is a durable cover for the preparation surface that snaps in and out of place, so that if the preparation surface is soiled, the cover can be removed and easily rinsed off.

The dedicated space for food preparation, the ability to use common kitchen appliances, and the "hooded countertop" aesthetic are intended to give users the perception of having their own kitchen within their sleeper cabin. Much like a kitchen in any home, it is robust and can accommodate a range of usage. For the motivated user, however, it provides the sense that it is possible to create many, if not all, of the meals they would like to prepare and enjoy.

The integrated unit is unimposing in its function, and therefore much of its meal preparation power is determined by the user. For the truck stop diner, it could easily provide for cold preparation meals and disposal for these meals in addition to in-motion disposal of snacks and drinks. For the moderate preparer, it will provide storage for ingredients and utensils, and a way to make a better and faster turkey sandwiches and soups. For the more serious user, this unit will provide the means of using most small kitchen appliances for more diverse and flavorful meals.

The system better facilitates meal preparation for those that want it, and allows other usage by those that lack the desire to bring such appliances into the truck. The product design provides for specific, dedicated storage for all reasonable items related to the in-cab dining experience (utensils, appliances, food . . . , etc). Drivers often complained about the lack of storage space as well as the difficulty in locating required items as these items were often stored in multiple locations throughout the truck. By providing specific, functional storage in a consolidated location, this integrated kitchen unit will enhance the driver's dining experience by making the process quicker and easier.

The task analysis drilled home the fact that drivers only have one primary location for the three phases of the dining experience: food preparation, cooking, and eating. With only one location for three activities, drivers are forced to perform only one activity at a time and clean the surface after each step. The design will provide a dedicated surface for each of these three steps. In so doing, our product will allow drivers to prepare meals in a more timely manner.

The system addresses the cleaning issue in two primary ways. First, the product will incorporate a garbage storage and disposal system to facilitate. Second, the inventors have developed a removable surface that can be discarded after each use. This removable surface will restrict waste to a specific area and allow the driver to easily remove waste in a sanitary manner.

The design also incorporates some of the key technological trends within the long-haul truck market. The inventors have purposely included an AC power outlet in the design to allow for third-party cooking devices. By simply including this outlet the inventors are providing truck drivers (who have a power inverter) easy access to a wide array of specialized devices, including new equipment that has yet to be invented. By providing an outlet and a specific location for the easy use of third-party devices we are differentiating our integrated kitchen unit in a technological dimension that has not been accomplished by any other truck OEM.

As described above, the integrated kitchen unit of this invention and vehicle made with the integrated kitchen unit provide a number of advantages, some of which have been described above and others of which are inherent in the invention. Also modifications may be proposed to the integrated kitchen unit of this invention and vehicle made with the integrated kitchen unit without departing from the teachings herein.

We claim:

1. A mobile vehicle in combination with an integrated kitchen unit, comprising:
   a cab engaged to a drive train bearing chassis;
   a sleeper compartment including a driver living space;
   said sleeper compartment including a mounting floor as well as off duty living space for a driver;
   an integrated kitchen unit mounted on said mounting floor within said sleeper compartment;
   said integrated kitchen unit being comprised of an integrated structural frame;
   said integrated structural frame including a rectangular lower section that is mounted to said mounting floor;
   a rear of said rectangular lower section projecting upwards with integrated side walls and an integrated back wall;
   said integrated side walls and integrated back wall engaged to each other at rear edges of said side walls and outer edges of said back wall;
   said integrated side walls and said integrated back wall extending upwards into an integrated rectangular upper section;
   said rectangular lower section enclosing an integrated refrigerator;
   an upper food preparation surface constituting an upper surface of said lower section;
   a disposal unit integrated into a side wall of said lower section;
   allowing a user to prepare items on said food preparation surface and slide waste directly into said disposal unit;
   an integrated microwave oven enclosed within said integrated rectangular upper section; and
   an alternating current plug-in AC power outlet engaged to provide power out of said integrated back wall.

2. The mobile vehicle of claim 1, wherein:
   a bendable and washable secondary surface attachable to said preparation surface, allowing for immediate cleanup by folding up the surface and cleaning it at a later time when the driver stops at a truck stop.

3. The mobile vehicle of claim 2, wherein:
   said secondary surface engageable to said food preparation surface by hook and loop fasteners.

4. The mobile vehicle of claim 1, wherein:
   said disposal unit being triangular based with an opening up at a top section adjacent to said food preparation surface.

5. The mobile vehicle of claim 4, wherein:
   upper storage drawers included in an area above said microwave oven.

6. The mobile vehicle of claim 5, wherein:
   said lower rectangular section including a storage drawer that is slidable out from under said food preparation surface.

7. The mobile vehicle of claim 6, wherein:
   a slidable table that is slidable out from between said storage drawer and said food preparation surface.

8. The mobile vehicle of claim 1, wherein:
   a DC to AC power inverter for converting DC power from a vehicle electrical system for said power outlets; and
   said inverter being electrically engaged to said AC power outlet through internal wiring.

9. The mobile vehicle of claim 7, wherein:
   a DC to AC power inverter for converting DC power from a vehicle electrical system for said power outlets; and
   said inverter being electrically engaged to said AC power outlet through internal wiring.

10. An integrated kitchen unit for a mobile vehicle, the vehicle having a sleeper compartment with a mounting floor, comprising:
   an integrated structural frame mountable on the mounting floor the vehicle;
   said integrated structural frame including a rectangular lower section;
   a rear of said rectangular lower section projecting upwards with integrated side walls and an integrated back wall;
   said integrated side walls and integrated back wall engaged to each other at rear edges of said side walls and outer edges of said back wall;
   said integrated side walls and said integrated back wall extending upwards into an integrated rectangular upper section;
   said rectangular lower section enclosing an integrated refrigerator;
   an upper food preparation surface constituting an upper surface of said lower section;

a disposal unit integrated into a side wall of said lower section;

allowing a user to prepare items on said food preparation surface and slide waste directly into said disposal unit;

an integrated microwave oven enclosed within said integrated rectangular upper section; and an alternating current plug-in AC power outlet engaged to provide power out of said integrated back wall.

11. The integrated kitchen unit of claim 10, wherein:

a bendable and washable secondary surface attachable to said preparation surface, allowing for immediate cleanup by folding up the surface and cleaning it at a later time when the driver stops at a truck stop.

12. The integrated kitchen unit of claim 11, wherein:

said secondary surface engageable to said food preparation surface by hook and loop fasteners.

13. The integrated kitchen unit of claim 10, wherein:

said disposal unit being triangular based with an opening up at a top section adjacent to said food preparation surface.

14. The integrated kitchen unit of claim 13, wherein:

upper storage drawers included in an area above said microwave oven.

15. The integrated kitchen unit of claim 14, wherein:

said lower rectangular section including a storage drawer that is slidable out from just under said food preparation surface.

16. The integrated kitchen unit of claim 15, wherein:

a slidable table that is slidable out from between said storage drawer and said food preparation surface.

* * * * *